United States Patent [19]

Shen et al.

[11] Patent Number: 5,381,362

[45] Date of Patent: Jan. 10, 1995

[54] REPROGRAMMABLE MATCHED OPTICAL FILTER AND METHOD OF USING SAME

[75] Inventors: Xiao An Shen, San Bruno; Yu Sheng Bai, Palo Alto; Eric M. Pearson, Menlo Park, all of Calif.

[73] Assignee: SRI International, Menlo Park, Calif.

[21] Appl. No.: 100,600

[22] Filed: Jul. 30, 1993

[51] Int. Cl.⁶ .......................... G06G 7/02; G06E 3/00
[52] U.S. Cl. ...................................... 364/825; 364/822
[58] Field of Search .................. 364/825, 822; 359/29, 359/107, 561, 306, 885, 891; 342/108; 375/96

[56] References Cited

U.S. PATENT DOCUMENTS

| | | | |
|---|---|---|---|
| 3,987,285 | 10/1976 | Perry | 235/152 |
| 4,071,907 | 1/1978 | Casasent | 364/822 |
| 4,108,538 | 8/1978 | Felstead | 350/162 |
| 4,459,682 | 7/1984 | Mossberg | 365/119 |
| 4,468,093 | 8/1984 | Brown | 350/162.12 |
| 4,507,746 | 3/1985 | Fletcher et al. | 364/717 |
| 4,633,426 | 12/1986 | Venier | 364/724 |
| 4,645,300 | 2/1987 | Brandstetter et al. | 359/885 X |
| 4,661,819 | 4/1987 | Lewis | 342/201 |
| 4,699,466 | 10/1987 | Brandstetter et al. | 350/162.12 |
| 4,869,574 | 9/1989 | Hartman | 350/162.13 |
| 5,005,946 | 4/1991 | Brandstetter | 364/822 X |
| 5,040,140 | 8/1991 | Horner | 364/822 |
| 5,121,248 | 6/1992 | Mohon et al. | 359/306 |
| 5,185,815 | 2/1993 | Brandstetter | 359/561 X |
| 5,220,622 | 6/1993 | Scarr | 364/822 X |
| 5,257,322 | 10/1993 | Matsuoka et al. | 359/561 X |

OTHER PUBLICATIONS

Bai et al., "Real-Time Optical Waveform Convolver/Cross Correlator," Applied Physics Letters, vol. 45, No. 7, (Oct. 1984), p. 714.
Mossberg, "Time-Domain Frequency Selective Optical Data Storage," Optics Letters, vol. 7, (1982), p. 77.
Zhang et al., "Use of Phase-Noisy Laser Fields in the Storage of Optical Pulse Shapes in Inhomogeneously Broadened Absorbers," Optics Letters, vol. 16, (1991), p. 103.
Bai et al., "Coherent transient optical pulse-shape storage/recall using frequency-swept excitation pulses," Optics Letters, vol. 11, (Nov. 1986), p. 724.

Primary Examiner—Tan V. Mai
Attorney, Agent, or Firm—Elliot B. Aronson

[57] ABSTRACT

A high-speed, high-throughput matched optical filter for processing data that allows for rapid reprogramming to change the reference signal or signals. A coherent time-domain optical memory system includes a coherent time-domain optical storage material (18) and a laser (16) for providing pulses of optical radiation in coherent time-domain optical storage relation with the storage material. One or more reference signals are first stored in the material by modulating one or more of the laser pulses with the reference signals and writing these pulses on the storage material (18) in close succession with their associated write pulses as is customary in coherent time-domain optical memories. The reference signals are phase encoded before they are stored. Another laser pulse modulated with the signal to be processed is then applied to the storage material. The echo signal induced by this signal pulse takes the form of the correlation of the reference pulse with the signal pulse. The use of phase encoded reference signals and a similarly phase encoded signal under analysis greatly enhances the ratio of the main peak to the side lobes in the echo signal when a match occurs. This greatly enhances the ability to detect a match. A plurality of reference signals may be stored in different spatial regions of the storage material (18). A lens assembly (23) is provided to expand the laser pulse modulated with the signal under analysis to cover all the spatial regions storing reference signals. In this manner a comparison may be performed simultaneously with all spatial regions. The echo signal will exhibit a strong correlation in that portion of the signal corresponding to the address of the matched reference signal.

9 Claims, 3 Drawing Sheets

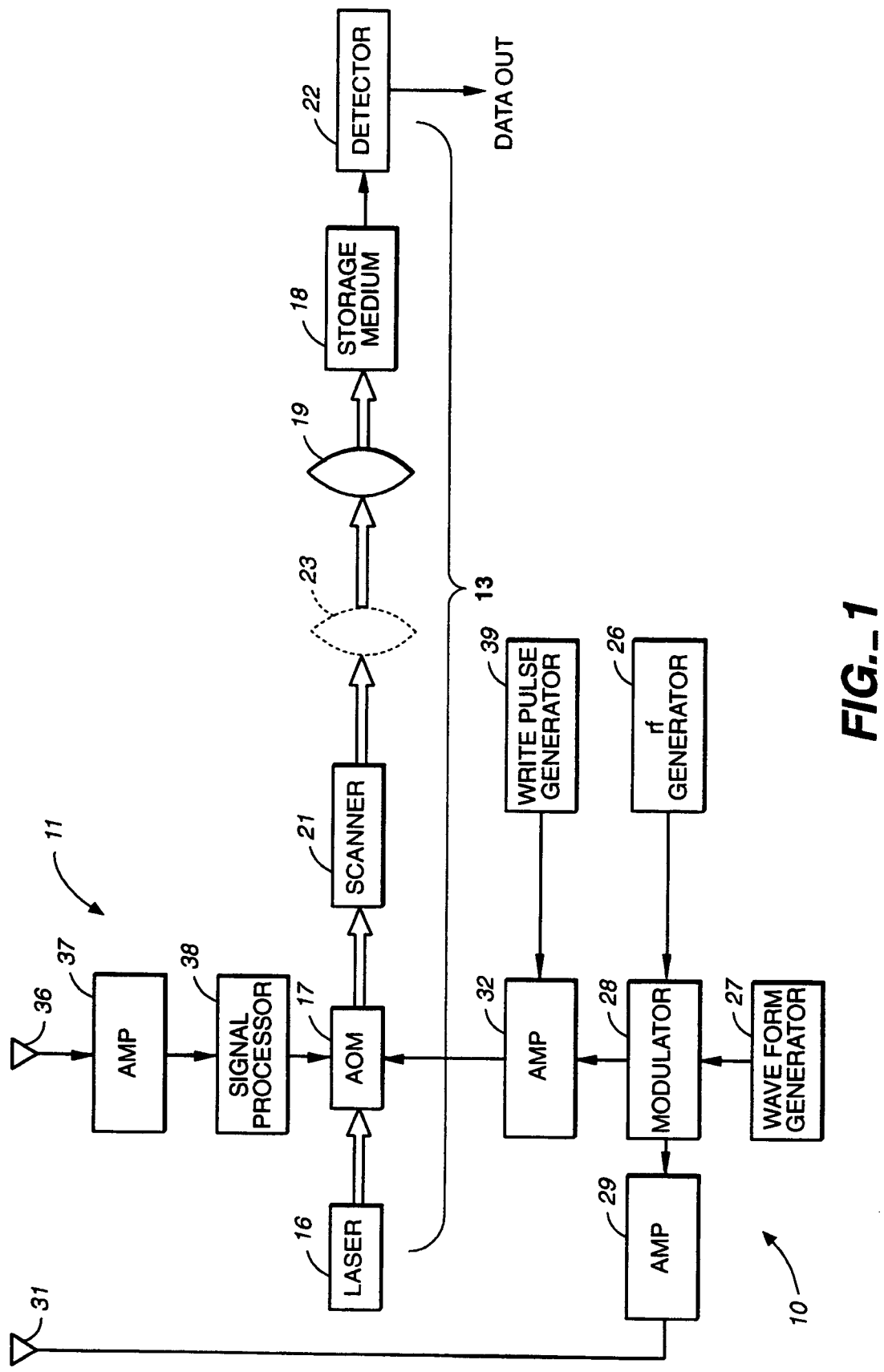
FIG._1

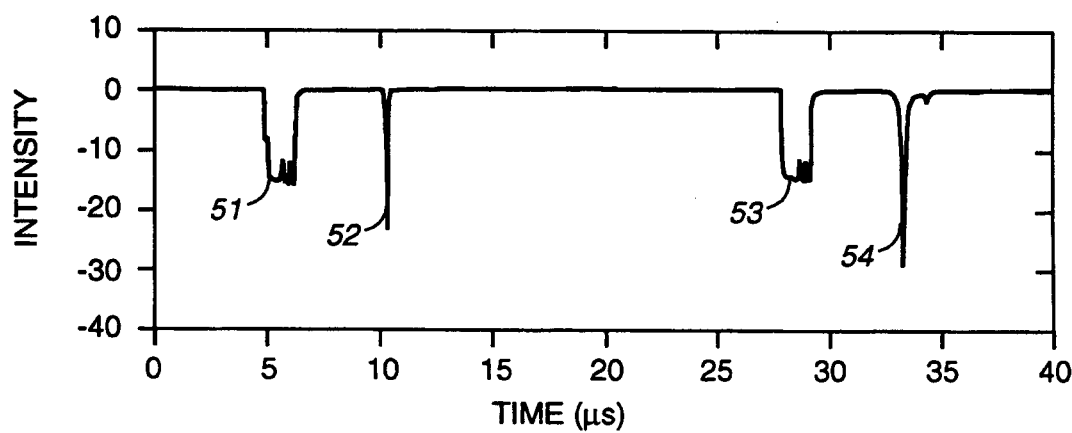
FIG._2A
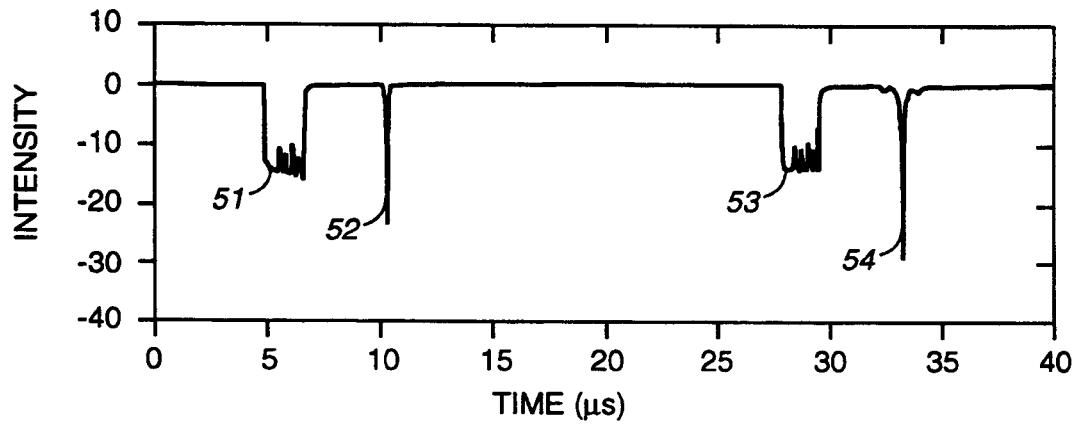
FIG._2B

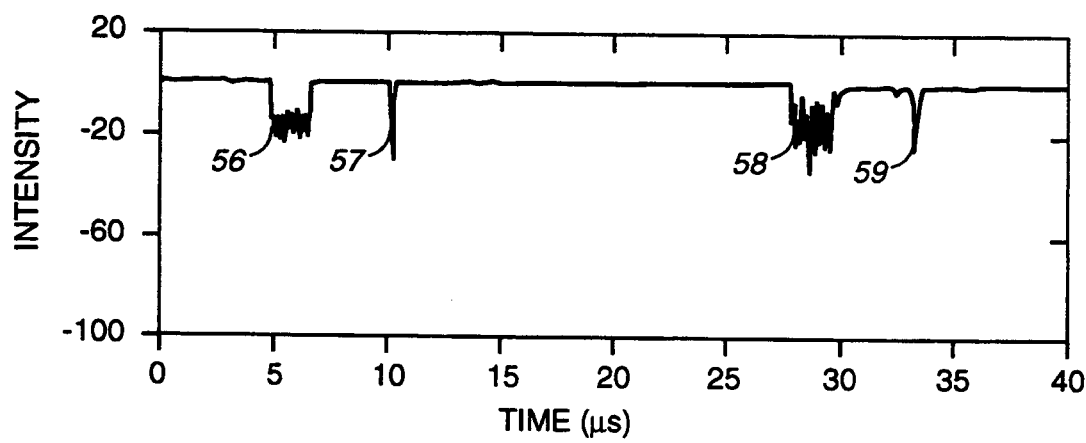
FIG._3A
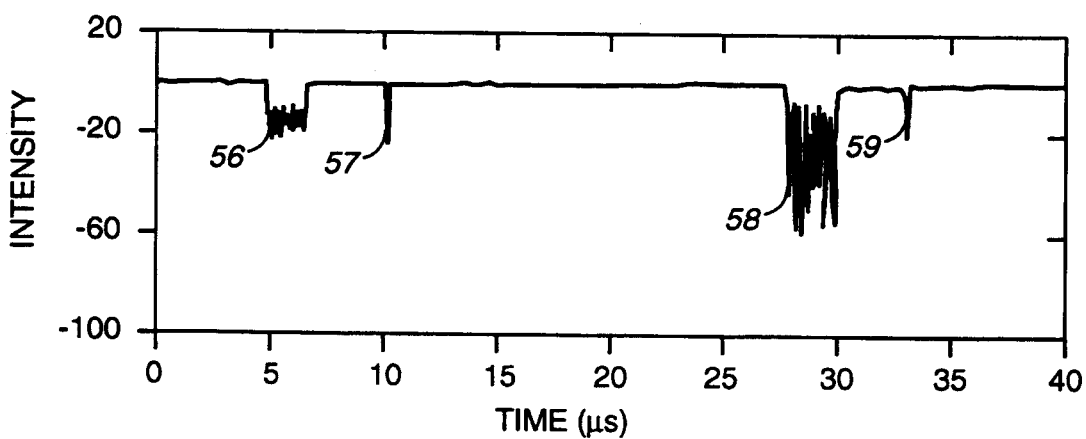
FIG._3B
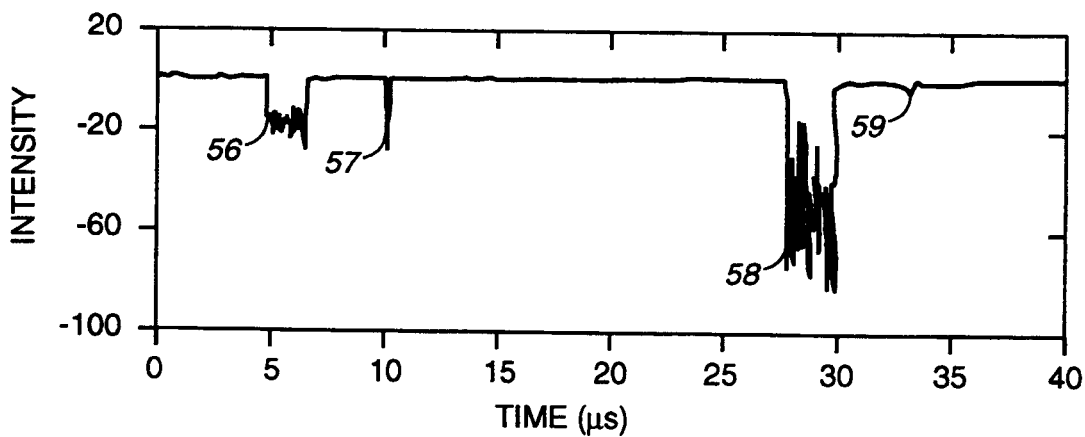
FIG._3C

REPROGRAMMABLE MATCHED OPTICAL FILTER AND METHOD OF USING SAME

BACKGROUND OF THE INVENTION

The present invention relates to matched filters for correlation and convolution of information-carrying signals and is more particularly directed to optical matched filters.

Matched filters are used to extract useful information from electronic or optical signals. They find particular use in applications calling for high-speed signal processing where large amounts of analog or digital data need to be analyzed and processed in real time. Such applications include advanced radars, large sonar systems, communication networks, and real-time pattern recognition, to mention just a few. In a radar system, for example, a transmitter sends a signal that has been coded in a characteristic way in the direction of a target, and a receiver looks for a return signal reflected by the target. The return signal is often difficult to detect because it may be extremely weak, or buried in noise, or masked by various forms of interference, including intentional jamming. The matched filter operates by comparing the received signal with the transmitted signal and looking for the transmitted signal's code in the received signal. When a match is found, the delay between the transmitted and return signals may be determined and the range of the target may be calculated.

As another example, in certain applications it is necessary to search a database looking for a best match between a given signal pattern and the contents of the database. This need arises for example in searching a database of text looking for a particular alphanumeric string, or in searching a database of characteristic sonar echo waveforms representing the characteristic ways in which particular types of objects reflect a sonar signal.

In high-speed or high-volume signal processing applications, the filter must balance such factors as the signal processing speed, the quantity of data that may be manipulated at a time, the shear size of the database, the bandwidth needed to process signals, or even the power levels involved. In applications involving coded signals or large databases, changes in the code or in the database also require a corresponding update to the filter so that the ease with which the filter may be "reprogrammed" with the new codes or reference data also becomes a factor. In attempts to balance these factors, matched filters have been fashioned in the past based on a variety of technologies such as tapped delay lines, acousto-electric correlators, or acousto-photorefractive effects. These techniques, however, generally suffer from limited capacity for storing reference signals or generally lack rapid reprogramming capability for changing reference signals, which are vital in high-speed processing. An extensive discussion of the prior art as well as an example of an electronic matched filter are given in U.S. Pat. No. 4,633,426 of Venier issued Dec. 30, 1986.

In another line of development optical signal processing techniques have been employed for processing information-bearing optical signals as well as non-optical signals. To process non-optical signals, an optical beam, usually a laser beam, is first modulated with the information-bearing non-optical signal. The processing then proceeds by manipulating the modulated optical beam, and the resultant processed optical signal may then be detected and demodulated. An example of such a system is disclosed in U.S. Pat. No. 5,121,248 of Mohon et al. issued Jun. 9, 1992, which also provides an extensive discussion of prior art acousto-optic filters.

In parallel with the above has been the development of optical memory systems. Optical memory refers generally to a data storage system that utilizes the properties of a light beam to store data in a storage medium and to retrieve the data from the medium. Various types of optical memory systems have been devised utilizing various properties of a light beam. Conventional two-dimensional optical memories store data at geographically defined spatial addresses on the storage medium taking advantage of the ability of a light beam to be focused to a very small and precise spatial extent. Frequency-domain optical memories and coherent time-domain optical memories are examples of other types of optical memories that exploit, in addition, the frequency characteristics, or more generally the spectral characteristics, of the light beam to store and retrieve data at increased storage capacities. Coherent time-domain optical memories utilize the phenomenon of stimulated photon echo pulses and have been explored in the publications of T. M. Mossberg, Optics Letters, Vol. 77, p. 77 (1982); Y. S. Bai, W. R. Babbit and T. W. Mossberg, Optics Letters, Vol. 11, p. 724 (1986); J. M. Zhang, D. J. Gauthier, J. Huang and T. W. Mossberg, Optics Letters, Vol. 16, p. 103 (1991). In an article by Y. S. Bai, W. R. Babbitt, N. W. Carlson and T. W. Mossberg entitled "Real-time optical waveform convolver/cross correlator," Applied Physics Letters, vol. 45 (Oct. 1, 1984), pp. 714–716, the authors demonstrated the possibility of using the stimulated photon echo phenomenon to derive the cross-correlation and/or convolution of two optical signals. See also U.S. Pat. No. 4,459,682 of Mossberg et al. pertaining to that technique.

SUMMARY OF THE INVENTION

The present invention provides a high-speed, high-throughput matched optical filter and method of using the filter to process data that allows for rapid reprogramming to change the reference signal or signals. Briefly, the invention utilizes a coherent time-domain optical memory system that comprises a coherent time-domain optical storage material and at least one laser for providing pulses of optical radiation in coherent time-domain optical storage relation with the storage material. One or more reference signals are first stored in the material by modulating one or more of the laser pulses with the reference signals and writing these pulses on the storage material in close succession with their associated write pulses as is customary in coherent time-domain optical memories. According to one aspect of the invention the reference signals are phase encoded before they are stored. Another laser pulse modulated with the signal to be processed is then applied to the storage material. The echo signal induced by this signal pulse takes the form of the correlation of the reference pulse with the signal pulse. The use of phase encoded reference signals and a similarly phase encoded signal under analysis greatly enhances the ratio of the main peak to the side lobes in the echo signal when a match occurs. This greatly enhances the ability to detect a match.

In another aspect of the invention a plurality of reference signals may be stored in different spatial regions of the storage material. The laser pulse modulated with the signal under test may be expanded to cover all the spatial regions storing reference signals. In this manner a comparison may be performed simultaneously with all spatial regions. The echo signal will exhibit a strong correlation in that portion of the signal corresponding to the address of the matched reference signal.

It is an advantage of the present invention that information-bearing optical pulses may be processed directly without the need for preliminary demodulation or conversion to lower frequencies. This feature of the invention makes it well suited for use with lidar systems. It is yet another advantage of the invention that it may process signals falling in an extremely wide range of frequencies since the optical frequencies at which the processing takes place can accomodate extremely wide data bandwidths.

Other aspects, advantages, and novel features of the invention are described below or will be readily apparent to those skilled in the art from the following specifications and drawings of illustrative embodiments.

BRIEF DESCRIPTION OF THE DRAWINGS

FIG. 1 is a block diagram of apparatus for practicing the invention.

FIGS. 2A and 2B are plots of experimental results demonstrating the compression of biphase-coded reference pulses achieved with an optical filter according to the invention. FIG. 2A shows simulated transmitted and received radar pulses modulated with a five-bit Barker code. FIG. 2B shows the same as FIG. 2A but with a thirteen-bit Barker code.

FIGS. 3A, B and C are plots of experimental results showing a simulated transmitted radar pulse encoded with a thirteen-bit Barker code and a noisy return pulse. FIGS. 3A, B and C represent three different noise levels added to the simulated return pulse.

DETAILED DESCRIPTION OF ILLUSTRATIVE EMBODIMENTS

The invention is illustrated here in the specific example of a radar system. Those skilled in the art will recognize from the descriptions below that the invention may be applied in numerous signal processing applications other than radar systems.

FIG. 1 shows a block diagram of apparatus for practicing the invention in a radar system. A radar transmitter unit, indicated generally at reference numeral 10, sends a radar pulse in the general direction of a target object. A pulse reflected by the target object is received by a radar receiving unit indicated generally at reference numeral 11. Both the transmitted pulse and the received pulse are applied to the optical filter apparatus indicated generally at reference numeral 13.

The optical filter arrangement of FIG. 1 includes a CW laser 16 used to generate reference, write, and return laser pulses. The beam from laser 16 is applied to an acousto-optic modulator 17 of known design, which modulates the beam with an appropriate modulation signal as discussed below. The modulated beam is applied to a storage medium 18 after passing through an optical arrangement 19 (illustrated diagrammatically in FIG. 1 ) for focusing the beam onto the storage medium and controlling the spot size. An X-Y scanner 21 is interposed for directing the beam to a desired spatial address on storage medium 18 so as to write to a selected address location. The echo signal from the storage medium is received at detector 22, which provides an output data signal. For other applications discussed below, the system may optionally include an additional lens assembly 23, shown in phantom in FIG. 1, for expanding the modulated laser pulse to cover large areas of the storage medium. Mechanisms for controlling the laser, controlling the spot size of the beam, addressing, and detecting echo pulse responses from the storage medium are well known and thus need not be described in further detail here.

The transmitted radar pulse is generated at block 10, which includes rf generator 26 that generates a long unmodulated carrier pulse at the radar frequency. Waveform generator 27 provides a waveform or code that is impressed on the carrier pulse from generator 26 by modulator 28. The modulated encoded radar signal from modulator 28 is applied through amplifier 29 to radar transmitting antenna 31, which sends the pulse toward the target object. Contemporaneously modulator 28 also applies the encoded pulse through amplifier 32 to acousto-optic modulator 17. Acousto-optic modulator 17 here acts as a frequency converter to convert the transmitted rf radar pulse to optical frequencies enabling the signal to be processed with the optical matched filter according to the invention. As explained more fully below, the transmitted radar pulse when converted to optical frequencies serves as a reference signal in the matched filter for processing received radar pulses.

The radar receiving unit 11 comprises a receiving antenna 36 for receiving return radar pulses reflected from the target object. The return signal from antenna 36 is amplified to the appropriate signal level at amplifier 37 and may also undergo preliminary conventional signal processing at this time at block 38. The return signal is then applied to acousto-optic modulator 17, which modulates a pulse from laser 16 to form the optical return pulse.

The system electronics also includes write-pulse generator 39 for generating an rf "write" pulse used in the coherent time-domain optical storage technique for writing a reference pulse (here the transmitted data pulse) onto the storage medium. The rf write pulse from generator 39 is applied to acousto-optic modulator 17, which modulates a pulse from laser 16 to form the optical write pulse.

At this stage it is beneficial to discuss the theoretical foundation of coherent time-domain optical storage. Known coherent time-domain optical memory systems typically use three laser pulses separated in time to excite an absorbing medium having appropriate spectral properties. A write pulse and a data pulse (or "reference" pulse in the present invention) are used to write the data to the storage medium. A third pulse is later applied to the medium to read the stored data. Let $E_i(\omega)$ be the Fourier transform of the i-th pulse, where pulse 1 is the write pulse, pulse 2 is the data pulse, and pulse 3 is the third pulse.

The spectral properties of suitable storage media are well known. In overview, the medium includes a material having a populated ground state and undergoing an absorption transition to an excited state having an inhomogeneously broadened absorption profile. The laser pulses are of a suitable frequency to induce the transition to the excited state, generally falling in the infrared, visible, or ultraviolet regions of the spectrum, and have suitably narrow linewidths compared with the inhomogeneously broadened absorption profile. Radiation in the infrared, visible, or ultraviolet regions of the spectrum will generally be referred to herein as optical radiation. Suitable storage materials for use in coherent time-domain data storage will be referred to herein simply as coherent time-domain optical storage materials, and the relation of the spectral properties of the laser pulses and absorbing material for the coherent time-domain storage to take place shall be referred to herein simply as coherent time-domain optical storage relation.

As is well known, the data written to the storage medium is stored by impressing the data upon the frequency profile of the ground state population of atoms in the local spatial region irradiated by the laser pulse. This is achieved in the following manner. The write and data pulses are both applied to the storage medium within the characteristic de-phasing time of the medium, that is, the characteristic de-phasing time of the particular transition used to record the data on the medium. In this circumstance the ground state frequency profile is determined by the coherent superposition of the Fourier transforms representing the write and data pulses:

$$\rho_{gg}(\omega) = 1 - (\mu/2\hbar)^2|E_1(\omega) + E_2(\omega)|^2 \quad (1)$$
$$= 1 - (\mu/2\hbar)^2[|E_1(\omega)|^2 + |E_2(\omega)|^2 + 2 Re E_1^*(\omega)E_2(\omega)]$$

where it is assumed that $$\mu|E_i(\omega)|/\hbar < 1. \quad (2)$$

The interference between these two pulses is represented by the term $$2Re E_1^*(\omega)E_2(\omega) \quad (3)$$

in Eq. (1), and it is this term that is impressed upon the absorption profile of the locally irradiated spatial region.

To read the stored data, a third pulse, sometimes referred to as a read pulse, having Fourier transform $E_3(\omega)$ is applied to the medium from the laser. As is well known in connection with coherent time-domain optical memories, the read pulse causes the medium to emit a so-called echo signal having Fourier transform:

$$E_e(\omega) \propto E_1^*(\omega)E_2(\omega)E_3(\omega) \quad (4)$$

The echo signal induced by the read pulse will replicate the data pulse $E_2(\omega)$ insofar as the product $E_1^*(\omega) E_3(\omega)$ is approximately flat over the bandwidth of $E_2(\omega)$. In the past this condition has been effectively achieved either by making the write and read pulses sufficiently short (see the article of T. M. Mossberg, Optics Letters, Vol. 7, p. 77 (1982)), or by frequency-chirping the write and read pulses in an identical manner (see Y. S. Bai, W. R. Babbit and T. W. Mossberg, Optics Letters, Vol. 11, p. 724 (1986)), or by phase-modulating the write and read pulses in an identical manner so that their energy is evenly spread over the data pulse bandwidth (see J. M. Zhang, D. J. Gauthier, J. Huang and T. W. Mossberg, Optics Letters, Vol. 16, p. 103 (1991)). None of these conditions is achieved in the present invention. Instead, the read pulse is replaced by the unknown, and presumably more complex, signal to be filtered. In the example of a radar system the read pulse is replaced by the return radar pulse to be analyzed.

The reason for this may be seen as follows. If the write pulse is sufficiently short in time, then its Fourier transform will be approximately constant at least over the frequency bandwidth of interest where the data and return pulses have their greatest contribution. The write pulse Fourier transform may then be removed from the integral defining the inverse Fourier transform of Equation (4). What remains is then the correlation of the reference pulse and the signal pulse to be analyzed (or the inverse of that correlation depending on whether the write pulse precedes or follows the reference pulse when writing to the storage medium).

In the past this correlation has not been utilized in a practical system because the correlation signal has been difficult to recognize. When amplitude modulation is employed to impress the data signal onto the laser pulse in a coherent time-domain memory system, the resulting data pulse generally has a number of sharply defined peaks. These peaks complicate the form of the correlation discussed above to the point where it is not practical to identify a correlation with any precision. In effect, the form of the amplitude-modulated data pulse leads to large sidelobes in the correlation function comparable with the central peak making it difficult if not impossible to adjudge the degree of correlation in any practical manner.

The present invention circumvents this difficulty by phase modulating the reference signal that is applied to the reference laser pulse and stored on the medium. The phase modulated reference signal is then compared with a similarly phase modulated signal under analysis.

To demonstrate the advantages of the present invention in the above radar system, a simulated transmitted rf pulse was coded using the so-called Barker codes. Both five-bit and thirteen-bit Barker codes were used to modulate the phase of simulated rf transmitted pulses. This modulation effectively divides a long pulse of duration T into N subpulses of length $\tau$, the phase of which either remains unchanged or is shifted by $\pi$. Here N is the length of the Barker code. The correlation of such a pulse with its replica yields a compressed pulse with side lobes. A property of the Barker codes is that the ratio of the compressed peak amplitude to the maximum side lobe amplitude is equal to N. Since the present invention performs the signal processing in the optical domain where the echo pulse energy is detected rather than amplitude, the measured signal is proportional to the square of the correlation function. Thus, the measured peak-to-side-lobe ratio is equal to $N^2$ instead of N. For the thirteen-bit Barker code, this ratio is 169. Such a large peak in the correlation function greatly simplifies the task of recognizing correlations.

Three rf pulses with a carrier frequency of 200 MHz were provided by an rf generator. Two of the pulses were temporally long and biphase-modulated according to the Barker codes to simulate the transmitted and received pulses in a radar system. The third pulse was of short duration (124 ns) and was uncoded to provide the write pulse. The phase modulation was accomplished with a biphase modulator driven by a waveform generator like the arrangement in FIG. 1. These three pulses were applied to an acousto-optic modulator modulating a single-frequency ring dye laser to generate three optical pulses at 610.5 nm. The acousto-optic modulator changes the carrier frequency of the input pulses from radio frequency to optical frequency while preserving the phase information of the pulses. The three optical pulses were focused into a $Pr^{3+}$:$YAlO_3$ crystal (0.1 at. %) in a co-propagating geometry of the type shown in FIG. 1. The sample crystal of dimensions 7 mm diameter and 2.5 mm thickness was mounted in a flowing helium vapor cryostat at a temperature of about 5.5K. The laser pulses thus resonantly excited the $Pr^{3+}$ ions in the crystal from the $^3H_4$ state to the $^1D_2$ state. This interaction generated an echo, which was detected by a photomultiplier tube. The relative delays between the reference pulse and write pulse and between the signal pulse and write pulse were taken to be 5 and 18 microseconds, respectively.

FIG. 2A shows the results obtained when the transmitted and received pulses were phase-modulated with a five-bit Barker code having a subpulse width of about 250 ns. FIG. 2B shows the results with a thirteen-bit Barker code and a subpulse width of about 125 ns., giving a total pulse area in FIG. 2B comparable to that in FIG. 2A. The results depicted in FIGS. 2A and 2B were obtained by averaging over 64 events at a rate of 20 Hz. In FIGS. 2A and 2B pulse 51 is the simulated transmitted pulse, pulse 52 is the write pulse, pulse 53 is the simulated return pulse, and pulse 54 is the induced echo pulse representing the correlation of the transmitted and return pulses. The strong peak in echo pulse 54 clearly establishes the correlation. Moreover, the timing between transmitted pulse 51 and return pulse 53 is the same as the timing between write pulse 52 and the sharp peak of echo pulse 54. This enables the timing of the return pulse to be determined with greater accuracy, thus providing greater range resolution in the radar system.

The time-bandwidth product of the transmitted pulse is a direct measure of the maximum signal-to-noise enhancement obtainable by the Barker codes. For the thirteen-bit code this product is thirteen. To demonstrate the remarkable ability to extract signals buried in noise, a random noise component was added to the thirteen-bit return pulse. The random noise was centered at 200 MHz and had a bandwidth of 70 MHz. The results are shown in FIGS. 3A, B and C. The transmitted, write, return, and echo pulses are designated by reference numerals 56, 57, 58 and 59, respectively. These results are single event results; no event averaging was used as in FIGS. 2A and B. FIG. 3A corresponds to a signal-to-noise ratio at rf levels of approximately 1.1. There is virtually no effect on the echo pulse. In FIG. 3B the noise level was increased by 10 dB while the signal power remained unchanged, and in FIG. 3C yet another 10 dB of noise was added. In FIG. 3B the sharp peak of the echo pulse is clearly exhibited. In FIG. 3C the echo intensity is greatly decreased, but even here the shape of the echo signal is preserved and the sharp peak is still discernable. The decrease in echo intensity exhibited is believed to be due to saturation of the acousto-optic modulator by the high noise power used. Greater signal-to-noise enhancements can be achieved by optimizing the system components and by attenuating the return signal to a power level a comfortable margin below the saturation power level of the acousto-optic modulator.

It may now be appreciated that the present invention may be applied beyond radar systems to applications where a signal under analysis is to be compared and correlated with one or more reference signals. In the above illustrative embodiment a single reference signal was provided by the transmitted radar pulse. The signal under analysis was the received signal, which includes the signal reflected by the target object with added noise or other interfering signals. The received signal was compared with the previously stored reference signal to find the best match. Because of the sharp peak in the echo signal, the time lapse between the transmitted and return pulses may be accurately determined even though the transmitted pulse may have a long duration and the return pulse may be buried in noise. The time lapse is equal to the time lapse between the write pulse and the well defined peak in the echo pulse. As mentioned above, this result is obtained in part by phase-modulating the rf transmitted pulse so as to eliminate extraneous peaks introduced by amplitude-modulating the laser beam with the rf transmitted pulse. Not only does the above system have a greatly enhanced ability to find the matching pattern buried in noise, the match is found extremely rapidly because the comparison of reference signal and signal under analysis takes place within the optical storage medium itself. That is, the optical storage medium serves both to store and to process the signals.

The present matched filter may be used to compare the signal under analysis contemporaneously with a large number of reference signals. Coherent time-domain optical memory systems have the capacity to store a plurality of signals at different spatial regions of the storage medium by scanning the laser beam reference pulse to different physical locations on the storage medium. A plurality of signals may also be stored at the same spatial location by tuning the wavelength of the laser beam reference pulse to different spectral locations under a broad inhomogeneous absorption profile for the transition of interest in the storage medium. In this way, potentially thousands of reference signals may be stored in the medium. To achieve this comparison the laser pulse is modulated with the signal under analysis and is expanded to cover the full physical area of the storage medium in which reference signals are stored, for example, by lens assembly 23 in FIG. 1. The modulated beam may also be tuned to the multiple frequencies at which the reference signals are stored. The resulting complex echo signal includes within it the correlations of the signal under analysis with all of the stored reference signals. Although one of ordinary skill in the art might expect that the echo pulse so generated would be too complex to extract useful information from without extensive further analysis, the echo signal is made readable by the extreme compression (i.e., high peak-to-sidelobe ratio) of the individual correlation functions with each reference signal. This compression is achieved in the above illustrative embodiment by phase modulating the reference signal to eliminate extraneous peaks in the echo pulse that would otherwise complicate the interpretation. This result may also be achieved by other equivalent forms of spread-spectrum modulation.

The ease with which the optical filter may be reprogrammed with different or further reference signals is now evident. It is merely necessary to modulate the laser beam with the new reference signal, tune the laser to the frequency of interest and direct it to the desired address on the storage medium. It is not necessary to change any hard-wired hardware or even to reprogram a microprocessor as is typically required in other prior art matched filters.

It is also noted that a matched filter according to the invention may advantageously be used in optical communication systems and lidar systems because information-bearing laser pulses may be applied to the filter with suitable phase modulation to be processed directly at optical frequencies.

The above descriptions and drawings disclose illustrative embodiments of the invention. Given the benefit of this disclosure, those skilled in the art will appreciate that various modifications, alternate constructions, and equivalents may also be employed to achieve the advantages of the invention. For example, other optical arrangements for generating the reference, write and signal pulses may be used and other arrangements for realizing the modulations. Codes other than the Barker codes illustrated here, of course, may be used to encode the reference and data pulses. Moreover, the matched filter may be applied to wide ranging applications such as seismic processing, computerized tomography, magnetic resonance imaging or other forms of imaging, and general pattern recognition. As noted in the radar example above, the filter is particularly useful for achieving correlations of signals with high bandwidths and time-bandwidth products. Therefore, the invention is not to be limited to the above description and illustrations, but is defined by the appended claims.

What is claimed is:

1. Optical filter apparatus for processing a data signal comprising:

a coherent time-domain optical storage material;

means for providing a reference pulse of coherent optical radiation phase modulated according to a predetermined phase modulation, said reference pulse being in coherent time-domain optical storage relation with said material;

means for optically storing said phase modulated reference pulse on a spatial region of said coherent time-domain optical storage material;

means for providing a data pulse of coherent optical radiation modulated with said data signal, said data pulse also being phase modulated according to said predetermined phase modulation and being in coherent time-domain optical storage relation with said material;

means for exposing said spatial region of said material to said phase modulated data pulse so as to generate an echo pulse representative of the correlation of said data pulse and reference pulse over said spatial region; and means for detecting said echo pulse, whereby said echo pulse displays a single peak if said data pulse matches said reference pulse.

2. The apparatus of claim 1 wherein said means for providing said reference pulse comprises:

a laser providing radiation in coherent time-domain optical storage relation with said material;

means for phase modulating said laser radiation according to said predetermined phase modulation; and means for modulating said laser radiation according to a reference signal.

3. The apparatus of claim 1 wherein said means for providing said data pulse comprises:

a laser providing radiation in coherent time-domain optical storage relation with said material; and means for modulating said laser radiation according to said data signal.

4. The apparatus of claim 3 wherein said means for providing said data pulse further comprises:

means for phase modulating said laser radiation according to said predetermined phase modulation.

5. The apparatus of claim 1 further comprising:

means for providing a plurality of reference pulses of coherent optical radiation phase modulated according to a predetermined phase modulation, said reference pulses being in coherent time-domain optical storage relation with said material;

means for optically storing said phase modulated reference pulses on a corresponding plurality of spatial regions of said coherent time-domain optical storage material;

means for contemporaneously exposing said plurality of spatial regions to said phase modulated data pulse so as to generate an echo pulse representative of the correlation of said data pulse with said distinct reference pulses over said plurality of spatial regions; and means for detecting said echo pulse, whereby said echo pulse displays a distinct peak for each said spatial region at which said data pulse matches the reference pulse stored thereon.

6. The apparatus of claim 5 wherein said means for exposing said spatial regions to said data pulse comprises optical means for expanding the breadth of said data pulse to encompass the entirety of said plurality of spatial regions.

7. A method of processing a data signal using an optical storage medium comprising a coherent time-domain optical storage material, said method comprising the steps of:

providing a reference pulse of coherent optical radiation phase modulated according to a predetermined phase modulation, said reference pulse being in coherent time-domain optical storage relation with said material;

optically storing said phase modulated reference pulse on a spatial region of said coherent time-domain optical storage material;

providing a data pulse of coherent optical radiation modulated with said data signal, said data pulse also being phase modulated according to said predetermined phase modulation and being in coherent time-domain optical storage relation with said material;

exposing said spatial region of said material to said phase modulated data pulse so as to generate an echo pulse representative of the correlation of said data pulse and reference pulse over said spatial region; and detecting said echo pulse, whereby said echo pulse displays a single peak if said data pulse matches said reference pulse.

8. The method of claim 7 wherein said step of providing said reference pulse comprises the substeps of:

providing a non-optical reference signal phase modulated according to said predetermined phase modulation; and modulating a reference pulse of coherent optical radiation with said phase modulated reference signal, said reference pulse being in coherent time-domain optical storage relation with said material.

9. The method of claim 7 further comprising the steps of:

providing a plurality of distinct reference pulses of coherent optical radiation phase modulated according to a predetermined phase modulation, said reference pulses being in coherent time-domain optical storage relation with said material;

optically storing said phase modulated distinct reference pulses on a corresponding plurality of spatial regions of said coherent time-domain optical storage material;

contemporaneously exposing said plurality of spatial regions to said phase modulated data pulse so as to generate an echo pulse representative of the correlation of said data pulse with said distinct reference pulses over said plurality of spatial regions; and detecting said echo pulse, whereby said echo pulse displays a distinct peak for each said spatial region at which said data pulse matches the reference pulse stored thereon.

* * * * *

UNITED STATES PATENT AND TRADEMARK OFFICE
CERTIFICATE OF CORRECTION

PATENT NO.       : 5,381,362
APPLICATION NO.  : 08/100600
DATED            : January 10, 1995
INVENTOR(S)      : Shen et al.

It is certified that error appears in the above-identified patent and that said Letters Patent is hereby corrected as shown below:

On Cover Page add --Ravinder Kachru, Redwood City,-- to inventors between "Eric M. Pearson, Menlo Park," and "all of Calif."

Signed and Sealed this

Twenty-second Day of January, 2008

JON W. DUDAS
*Director of the United States Patent and Trademark Office*